United States Patent
Sanchez Ortiz et al.

(10) Patent No.: US 11,612,962 B2
(45) Date of Patent: Mar. 28, 2023

(54) LASER DIRECT STRUCTURE (LDS) ANTENNA ASSEMBLY

(71) Applicant: AVX Antenna, Inc., San Diego, CA (US)

(72) Inventors: Francisco Carlos Sanchez Ortiz, San Diego, CA (US); Cheol Hoon Seol, San Diego, CA (US)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 118 days.

(21) Appl. No.: 17/122,242

(22) Filed: Dec. 15, 2020

(65) Prior Publication Data

US 2021/0187662 A1 Jun. 24, 2021

Related U.S. Application Data

(60) Provisional application No. 62/950,543, filed on Dec. 19, 2019.

(51) Int. Cl.
*H01Q 1/38* (2006.01)
*B23K 26/364* (2014.01)
*H01Q 1/24* (2006.01)

(52) U.S. Cl.
CPC ............. *B23K 26/364* (2015.10); *H01Q 1/38* (2013.01); *H01Q 1/242* (2013.01)

(58) Field of Classification Search
CPC ........ B23K 26/364; H01Q 1/38; H01Q 1/242; H01Q 1/243; H01Q 1/40; H01Q 1/36; H01Q 21/28
See application file for complete search history.

(56) References Cited

U.S. PATENT DOCUMENTS

| | | | | |
|---|---|---|---|---|
| 2011/0279331 A1* | 11/2011 | Mattis | ...................... | H01Q 9/04 343/702 |
| 2012/0235879 A1* | 9/2012 | Eder | ........................ | H01Q 1/40 343/873 |
| 2014/0009343 A1* | 1/2014 | Lellici | ...................... | H01Q 9/42 343/700 MS |
| 2014/0162070 A1* | 6/2014 | Motegi | .................. | C08L 51/003 524/409 |
| 2015/0029061 A1* | 1/2015 | Larsen | ................. | H01Q 19/005 343/702 |
| 2015/0048989 A1* | 2/2015 | Chen | ...................... | H01Q 5/378 343/843 |
| 2018/0309189 A1* | 10/2018 | Gu | ...................... | H01Q 21/0025 |
| 2020/0097102 A1* | 3/2020 | Zhang | .................... | H01Q 1/362 |

OTHER PUBLICATIONS

International Search Report and Written Opinion for Application No. PCT/US2020/065066, dated Apr. 12, 2021, 8 pages.

* cited by examiner

*Primary Examiner* — David E Lotter
(74) *Attorney, Agent, or Firm* — Dority & Manning, P.A.

(57) ABSTRACT

A laser direct structure (LDS) antenna assembly is provided. The LDS antenna assembly includes a carrier having a first portion formed from a first resin and a second portion formed from a second resin that is different than the first resin. The LDS antenna assembly further includes an LDS antenna disposed on the carrier. The LDS antenna assembly includes a component coupled to the LDS antenna via a connection point positioned on a surface of the first portion of the carrier such that the component is in electrical communication with the LDS antenna via the connection point.

20 Claims, 5 Drawing Sheets

LASER DIRECT STRUCTURE (LDS) ANTENNA ASSEMBLY

PRIORITY CLAIM

The present application claims the benefit of priority of U.S. Provisional App. No. 62/950,543, titled "Laser Direct Structure (LDS) Antenna Assembly," having a filing date of Dec. 19, 2019, which is incorporated by reference herein.

FIELD

The present disclosure relates generally to a LDS antenna assembly and; more particularly, a method of manufacturing the LDS antenna assembly.

BACKGROUND

LDS antennas can be disposed on a carrier. For instance, a laser device can be used to etch a channel into an exterior surface of the carrier. The shape of the channel can correspond to the shape of a LDS antenna intended to be disposed on the carrier. The carrier can then be plated in a metal bath such that the channel is filled with a metal needed to form the LDS antenna. LDS antennas can be used in a variety of applications. For example, LDS antennas can be used in mobile phones (e.g., cellphones). In particular, LDS antennas can be formed on a housing of a mobile phone.

SUMMARY

Aspects and advantages of embodiments of the present disclosure will be set forth in part in the following description, or may be learned from the description, or may be learned through practice of the embodiments.

In one aspect, a laser direct structure (LDS) antenna assembly is provided. The LDS antenna assembly includes a carrier having a first portion formed from a first resin and a second portion formed from a second resin that is different than the first resin. The LDS antenna assembly further includes an LDS antenna disposed on the carrier. The LDS antenna assembly includes a component coupled to the LDS antenna via a connection point positioned on a surface of the first portion of the carrier such that the component is in electrical communication with the LDS antenna via the connection point.

In another aspect, a method of manufacturing a LDS antenna assembly is provided. The method includes forming a LDS antenna on a carrier of the LDS antenna assembly. The carrier includes a first portion formed using a first resin and a second portion formed using a second resin that is different than the first resin. The method includes coupling a component to a connection point positioned on a surface of the first portion of the carrier such that the component is in electrical communication with the LDS antenna via the connection point.

In yet another aspect, a LDS antenna assembly is provided. The LDS antenna assembly includes a carrier having a first portion, a second portion and a third portion. The first portion and the third portion each include a first resin. The second portion includes a second resin that is different than the first resin. The LDS antenna assembly includes a first LDS antenna and a second LDS antenna. The first LDS antenna and the second LDS antenna are each disposed on the carrier. The LDS antenna assembly includes a first component coupled to the first LDS antenna via a first connection point positioned on a surface of the first portion of the carrier such that the first component is in electrical communication with the first LDS antenna via the connection point. The LDS antenna assembly includes a second component coupled to the second LDS antenna via a second connection point positioned on a surface of the third portion of the carrier such that the second component is in electrical communication with the second LDS antenna via the second connection point positioned on the surface of the third portion of the carrier.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
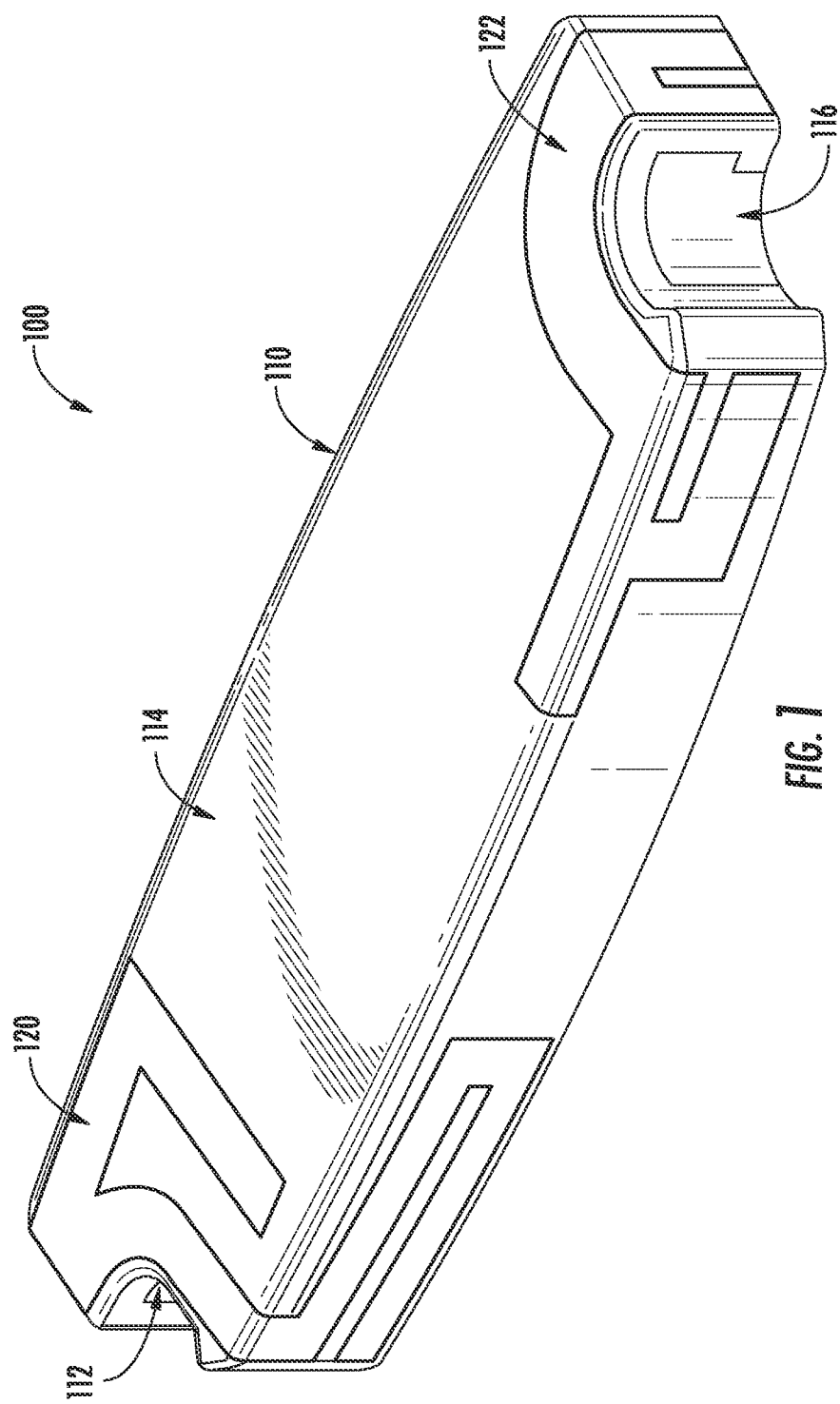
FIG. 1 depicts a LDS antenna assembly according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Typical LDS assemblies include a carrier on which a LDS antenna is disposed. The carrier is formed using a resin or material having a thermal resistance that allows components (e.g., coaxial cables, passive electrical components) to be soldered thereto. However, the resin negatively affects the performance of the LDS antenna. Furthermore, the components are often soldered directly to the LDS antenna, which also negatively affects the performance of the LDS antenna.

Example aspects of the present disclosure are directed to an LDS antenna assembly having a carrier that includes a first portion and a second portion. The first portion of the carrier and the second portion of the carrier are each formed using different resins such that a thermal resistance of the first portion is greater than a thermal resistance of the second portion. As will be discussed below in more detail, one or more components (e.g., coaxial cable, flexible printed circuits, spring contacts, pogo pins, passive electrical component, active electrical component, etc.) can be in electrical communication with the LDS antenna via the first portion of the carrier.

The first portion of the carrier includes one or more connection points. In particular, the one or more connection points can be positioned on an exterior surface of the first portion of the carrier. In some implementations, the one or more connection points can include a solder point. In such implementations, the LDS antenna and a component of the LDS antenna assembly can each be soldered to the solder point. In this manner, the component can be in electrical communication with the LDS antenna without directly contacting the LDS antenna.

The LDS antenna assembly according to example aspects of the present disclosure can provide numerous technical benefits. For instance, the second portion of the carrier is made to be larger than the first portion of the carrier to reduce or eliminate the negative effect the high-heat resin used to form the first portion of the carrier has on the LDS antenna disposed on the carrier. Furthermore, the first portion of the carrier includes one or more connection points. In this manner, performance of the LDS antenna is improved, because the components are not soldered directly to the LDS antenna. Instead, the components are soldered to the one or more connection points of the first portion of the carrier. In this manner, performance (e.g., gain) of the LDS antenna disposed on the carrier of the antenna assembly according to the present disclosure can be improved (e.g., by about 15%) compared to performance of the same LDS antenna when disposed on a conventional carrier.

It should be appreciated that the LDS antenna assembly according to example aspects of the present disclosure can be used in a variety of different applications. For example, the LDS antenna assembly can be used in mobile phones (e.g., cellphones), mobile computing device (e.g., laptops), video game consoles, wireless printers, wireless routers, inventory tracking systems, medical devices, vehicle tracking systems, unmanned aerial vehicles (UAVs), or any other suitable device having one or more LDS antennas As used herein, use of the term "about" in conjunction with a numerical value is intended to refer to within 25% of the stated numerical value. Furthermore, the term "resin" is intended to refer to a material or a combination of materials.

Figure 2:
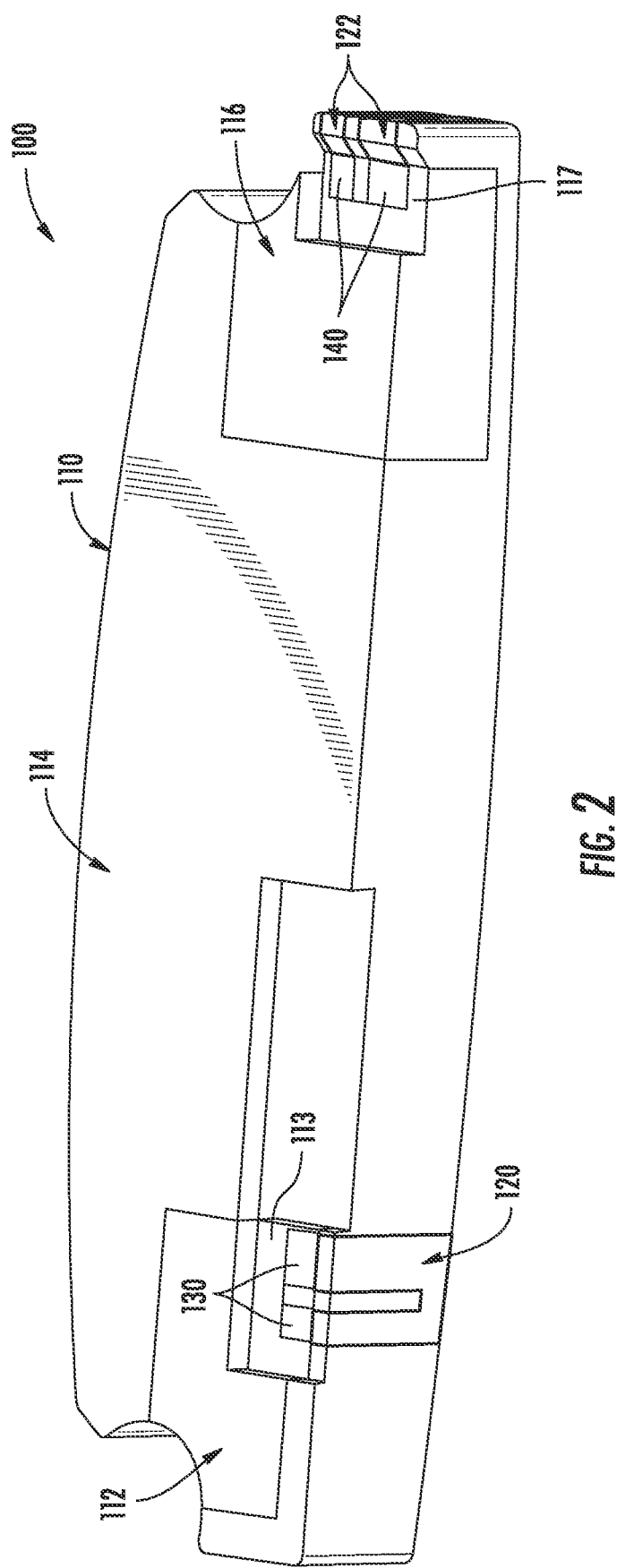
FIG. 2 depicts another view of the LDS antenna assembly of FIG. 1 according to example embodiments of the present disclosure.

Referring now to the FIGS., FIGS. 1 and 2 depict an antenna assembly 100 according to example embodiments of the present disclosure. The antenna assembly 100 can include a carrier 110 having a first portion 112 and a second portion 114 that is larger than the first portion 112. More specifically, a surface area of the second portion 114 of the carrier 110 can be greater than a surface area of the first portion 112 of the carrier 110. For instance, in some implementations, the surface area of the second portion 114 of the carrier 110 can be greater than about 60% of a total surface area of the carrier 110, such as about 70% of the total surface area, such as about 80% of the total surface area, or such as about 90% of the total surface area.

It should be understood that the carrier 110 can include any suitable component configured to accommodate one or more antennas. For instance, in some implementations, the carrier 110 can be an enclosure (e.g., cover, housing, radome) for one or more antenna. It should also be understood that the first portion 112 of the carrier 110 and the second portion 114 of the carrier 110 are formed using different resins. For instance, the first portion 112 of the carrier 110 can be formed using a first resin, whereas the second portion 114 of the carrier 110 can be formed using a second resin that is different than the first resin. It should also be understood that a thermal resistance of the first resin used to form the first portion 112 of the carrier 110 is greater than a thermal resistance of the second resin used to form the second portion 114 of the carrier 110. In this manner, the first portion 112 of the carrier 110 can be more resistant to heat than the second portion 114 of the carrier 110.

In some implementations, the first resin can be a first polycarbonate and the second resin can be a second polycarbonate that is different than the first polycarbonate. Alternatively, or additionally, the first resin can include an additive, such as fiberglass. It should be appreciated, however, that the first resin can include any suitable type of additive so long as the thermal resistance of the first resin is greater than the thermal resistance of the second resin. Example resins can include, for instance, Acrylonitrile butadiene styrene (ABS), polycarbonate ABS (PC-ABS), polyamides (PA), polyphthalamides (PPA), polycarbonate polyethylene terephthalate (PC/PET), polybutylene terephthalate (PBT), liquid crystal polymers (LCP), and polyphenylene ether (PPE).

In some implementations, the carrier 110 can include a third portion 116 that is formed using the first resin that is used to form the first portion 112 of the carrier 110. As shown, the second portion 114 can be positioned between the first portion 112 and the third portion such that the first portion 112 and the third portion 116 do not contact (e.g., touch) one another. Furthermore, a size of the third portion 116 of the carrier 110 can be less than the size of the second portion 114 of the carrier 110. In some implementations, a size of the third portion 116 of the carrier 110 can be the same as the size of the first portion 112 of the carrier 110. In alternative implementations, the size of the third portion 116 of the carrier 110 can be different than the size of the first portion 112 of the carrier 110. For instance, in some implementations, the third portion 116 of the carrier 110 can be larger than the first portion 112 of the carrier 110. In alternative implementations, the third portion 116 of the carrier 110 can be smaller than the first portion 112 of the carrier 110.

Although the carrier 110 of the antenna assembly 100 discussed above is described as having two separate portions (e.g., first portion 112 and third portion 116) formed using the first resin, it should be appreciated that the carrier 110 can include more or fewer portions formed using the first resin. However, in implementations in which the carrier 110 includes multiple portions formed using the first resin, it should be understood that a surface area of the second portion 114 of the carrier 110 is greater than a combined surface area of the portions (e.g., first portion 112, third portion 116) formed using the first resin.

The antenna assembly 100 can include one or more laser direct structure (LDS) antennas disposed on the carrier 110. For instance, as shown in FIGS. 1 and 2, the carrier 110 can be configured to accommodate a first LDS antenna 120 of the antenna assembly 100 and a second LDS antenna 122 of the antenna assembly 100. It should be appreciated, however, that the carrier 110 can be configured to accommodate more or fewer LDS antennas.

In some implementations, the first LDS antenna 120 can be disposed entirely on the second portion 114 of the carrier 110. In alternative implementations, the first LDS antenna 120 can be disposed on both the first portion 112 of the carrier 110 and the second portion 114 of the carrier 110. In such implementations, a greater portion of the first LDS antenna 120 is disposed on the second portion 114 of the carrier 110 than on the first portion 112 of the carrier 110. In this manner, degradation in performance of the first LDS antenna 120 due, at least in part, to the first resin used to form the first portion 112 of the carrier 110 can be reduced.

In some implementations, the second LDS antenna 122 can be disposed entirely on the second portion 114 of the carrier 110. In alternative implementations, the second LDS antenna 122 can be disposed on both the second portion 114 of the carrier 110 and the third portion 116 of the carrier 110. In this manner, degradation in performance of the second LDS antenna 122 due, at least in part, to the first resin used to form the third portion 116 of the carrier 110 can be reduced.

It should be appreciated that the one or more LDS antennas of the antenna assembly 100 can be configured to communicate on any suitable frequency band. For instance, in some implementations, the first LDS antenna 120 can be configured to communicate with one or more devices on a Bluetooth network. Alternatively, or additionally, the second LDS antenna 122 can be configured to communicate with one or more devices on a Wifi network. In some implementations, the one or more LDS antennas of the antenna assembly 100 can be configured to communicate with one or more devices on a cellular network.

The first portion 112 of the carrier 110 can include one or more connection points 130. More specifically, the one or more connection points 130 can be positioned on a surface 113 of the first portion 112 of the carrier 110. In some implementations, the one or more connection points 130 can be positioned on the surface 113 of the first portion 112 of the carrier 110 such that the one or more connection points 130 abut the second portion 114 of the carrier 110. The first LDS antenna 120 can be coupled to the first portion 112 of the carrier 110 via the one or more connection points 130. For instance, in some implementations, the one or more connection points 130 can include solder points. In such implementations, the first LDS antenna 120 can be soldered to the one or more connection points 130 positioned on the surface 113 of the first portion 112 of the carrier 110.

Furthermore, the third portion 116 of the carrier 110 can include one or more connection points 140. More specifically, the one or more connection points 140 can be positioned on a surface 117 of the third portion 116 of the carrier 110. In some implementations, the one or more connection points 140 can be positioned on the surface 117 of the third portion 116 of the carrier 110 such that the one or more connection points 140 abut the second portion 114 of the carrier 110. The second LDS antenna 122 can be coupled to the third portion 116 of the carrier 110 via the one or more connection points 140. For instance, in some implementations, the one or more connection points 140 can include one or more solder points. In such implementations, the second LDS antenna 122 can be soldered to the one or more connection points 140 positioned on the surface 117 of the third portion 116 of the carrier 110.

Figure 3:
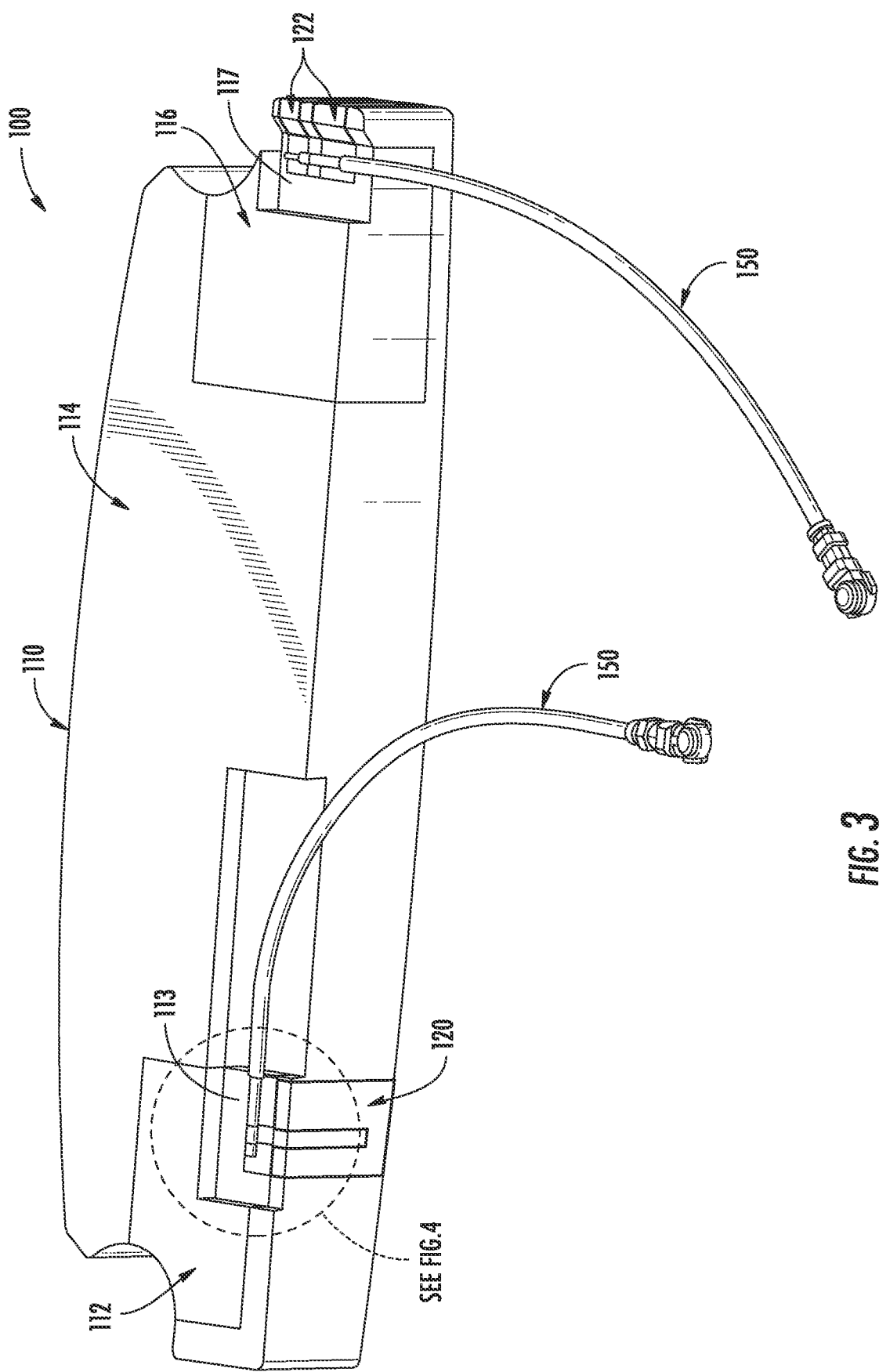
FIG. 3 depicts components attached to a LDS antenna assembly according to example embodiments of the present disclosure.
Figure 4:
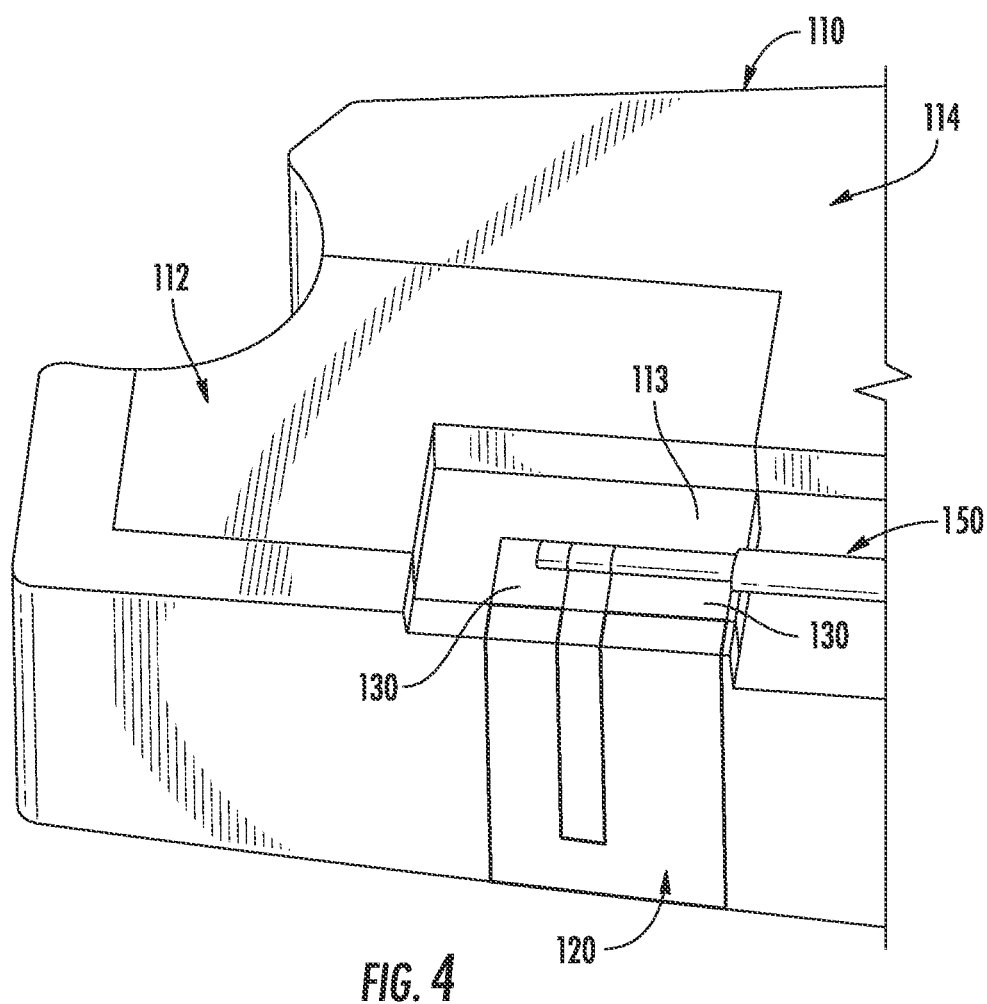
FIG. 4 depicts an exploded view of a portion of FIG. 3 according to example embodiments of the present disclosure.

Referring now to FIGS. 3 and 4, the antenna assembly 100 can include one or more components 150 coupled to the first LDS antenna 120 via the one or more connection points 130 of the first portion 112 of the carrier 110. For instance, in some implementations, the one or more components 150 can be soldered to the one or more connection points 130. It should be understood that performance of the first LDS antenna 120 can be degraded when the one or more components 150 are directly connected to the first LDS antenna 120. As such, performance of the first LDS antenna 120 of the antenna assembly 100 according to the present disclosure can be improved, because the one or more components 150 are not directly connected to the first LDS antenna 120. Instead, the one or more components 150 are coupled to the first LDS antenna 120 via the one or more connection points 130 positioned on the surface 113 of the first portion 112 of the carrier 110.

In some implementations, the antenna assembly 100 can include one or more components 150 coupled to the second LDS antenna 122 via the one or more connection points 140 of the third portion 116 of the carrier 110. For instance, in some implementations, the one or more components 150 can be soldered to the one or more connection points 140. It should be understood that performance of the second LDS antenna 122 can be degraded when the one or more components 150 are directly connected to the second LDS antenna 122. As such, performance of the second LDS antenna 122 of the antenna assembly 100 according to the present disclosure can be improved, because the one or more components 150 are not directly connected to the second LDS antenna 122. Instead, the one or more components 150 are coupled to the second LDS antenna 122 via the one or more connection points 140 defined by the third portion 116 of the carrier 110.

As shown, the one or more components 150 can include a coaxial cable. It should be appreciated, however, that the one or more components can include any suitable type of electrical component. For instance, in some implementations, the one or more components 150 can include a passive electrical component. Examples of passive electrical components can include, without limitation, resistors, capacitors, and inductors. In alternative implementations, the one or more components 150 can include an active electrical component. Examples of active electrical components can include, without limitation, transistors (e.g., MOSFETs, BJTs, etc.).

Figure 5:
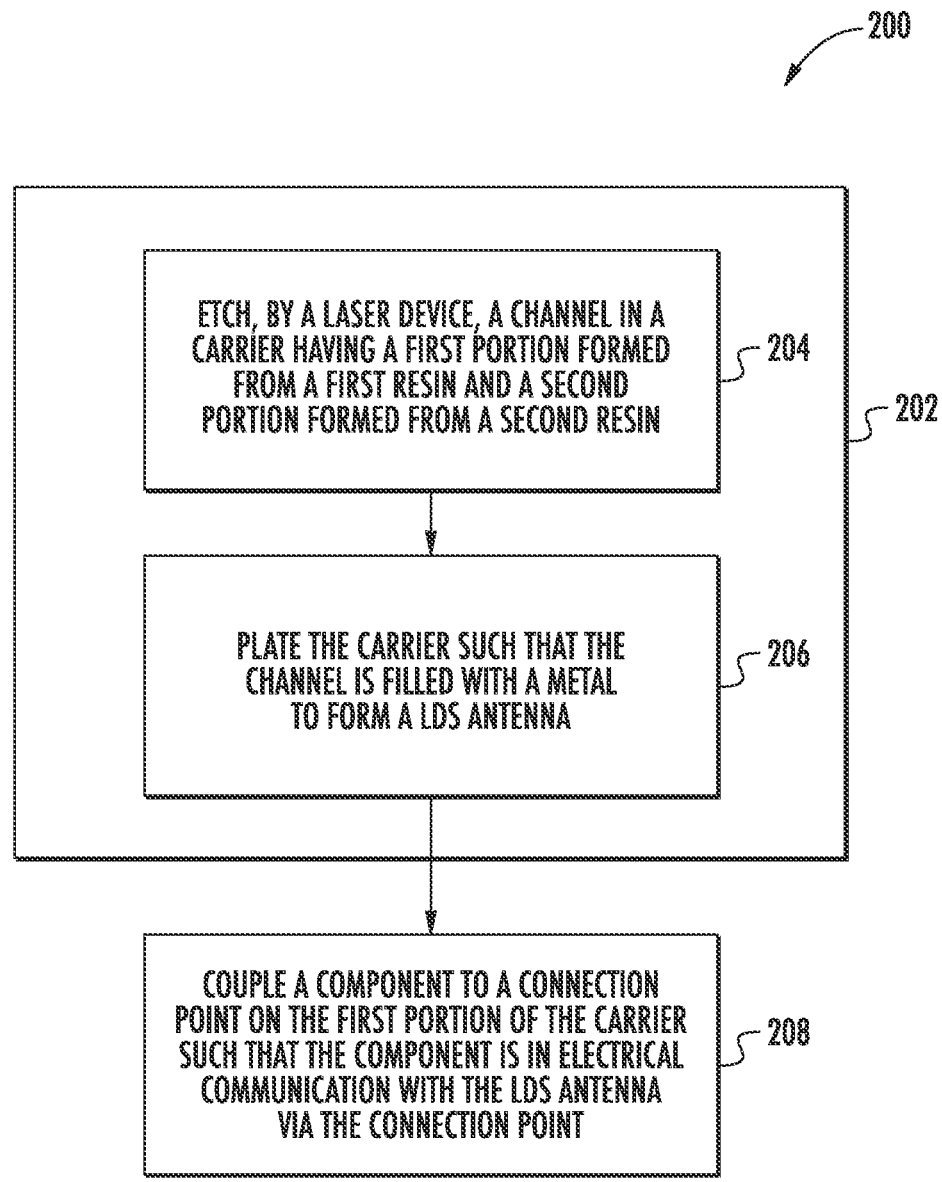
FIG. 5 depicts a flow diagram of a method for manufacturing a LDS antenna assembly according to example embodiments of the present disclosure.

Referring now to FIG. 5, a flow diagram of a method 200 of manufacturing a LDS antenna assembly is provided according to example embodiments of the present disclosure. FIG. 5 depicts steps performed in a particular order for purposes of illustration and discussion. Those of ordinary skill in the art, using the disclosures provided herein, will understand that various steps of any of the methods described herein can be adapted, omitted, rearranged, include steps not illustrated, performed simultaneously, and/or modified in various ways without deviating from the scope of the present disclosure.

At (202), the method 200 can include forming a LDS antenna on a carrier comprising a first portion formed from a first resin and a second portion formed from a second resin that is different than the first resin. In some implementations, forming the LDS antenna can include, at (204), etching, by a laser device, a channel in a surface of the carrier. For instance, in some implementations, the surface can include an exterior surface of the carrier. It should be understood that a shape of the channel etched using the laser device can correspond to a shape of the LDS antenna to be formed on the surface of the carrier. Subsequent to etching the channel in the surface of the carrier, forming the LDS antenna can further include, at (206), plating the carrier in a metal bath to fill the channel with metal to form the LDS antenna.

At (208), the method 200 can include coupling a component to a connection point on the first portion of the carrier such that the component is in electrical communication with the LDS antenna via the connection point. In some implementations, coupling the component to the connection point can include soldering the component to the connection point. It should be appreciated that the component can include any suitable type of electrical component. For instance, in some implementations, the electrical component can include a passive electrical component (e.g., capacitor, resistor, inductor). In alternative implementations, the electrical component can include an active electrical component (e.g., transistor).

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A laser direct structure (LDS) antenna assembly, comprising:
    a carrier comprising a first portion and a second portion, the first portion recessed in the second portion, the first portion formed from a first resin, the second portion formed from a second resin that is different than the first resin;
    a LDS antenna disposed on the carrier; and
    a component coupled to the LDS antenna via a connection point positioned on a surface of the first portion of the carrier such that the component is in electrical communication with the LDS antenna via the connection point.

2. The LDS antenna assembly of claim 1, wherein a thermal resistance of the first portion of the carrier is greater than a thermal resistance of the second portion of the carrier.

3. The LDS antenna assembly of claim 2, wherein a surface area of the second portion of the carrier is greater than a surface area of the first portion of the carrier.

4. The LDS antenna assembly of claim 3, wherein a greater portion of the LDS antenna is disposed on the second portion of the carrier than on the first portion of the carrier.

5. The LDS antenna assembly of claim 3, wherein the LDS antenna is disposed entirely on the second portion of the carrier.

6. The LDS antenna assembly of claim 4, wherein:
    the first resin comprises a first polycarbonate; and
    the second resin comprises a second polycarbonate that is different than the first polycarbonate.

7. The LDS antenna assembly of claim 6, wherein the first resin further comprises fiberglass.

8. The LDS antenna assembly of claim 1, wherein the connection point is positioned on the first portion of the carrier such that the connection point abuts the second portion of the carrier.

9. The LDS antenna assembly of claim 1, wherein the second portion of the carrier defines a channel configured to accommodate the LDS antenna.

10. The LDS antenna assembly of claim 1, wherein the component comprises a coaxial cable.

11. The LDS antenna assembly of claim 1, wherein the component comprises a passive electrical component.

12. The LDS antenna assembly of claim 1, wherein the component comprises an active electrical component.

13. The LDS antenna assembly of claim 12, wherein the active electrical component comprises a transistor.

14. A method of manufacturing a laser direct structure (LDS) antenna assembly, the method comprising:
    forming a LDS antenna on a carrier of the LDS antenna assembly, the carrier comprising a first portion formed using a first resin and a second portion formed using a second resin that is different than the first resin, the first portion being recessed in the second portion; and
    coupling a component to a connection point positioned on a surface of the first portion of the carrier such that the component is in electrical communication with the LDS antenna via the connection point.

15. The method of claim 14, wherein a thermal resistance of the first portion of the carrier is greater than a thermal resistance of the second portion of the carrier.

16. The method of claim 14, wherein coupling a component to a connection point formed on the first portion of the carrier comprises soldering the component to the connection point such that the component is in electrical communication with the LDS antenna via the connection point.

17. The method of claim 14, wherein forming the LDS antenna comprises:
    etching, by a laser device, a channel into a surface of the carrier; and
    subsequent to etching the channel, plating the carrier in a metal bath such that the channel is filled with a metal to form a laser direct structure (LDS) antenna.

18. The method of claim 15, wherein the component comprises an active electrical component or a passive electrical component.

19. A laser direct structure (LDS) antenna assembly, comprising:
    a carrier comprising a first portion, a second portion and a third portion, the first portion and the third portion each recessed in the second portion, the first portion and the third portion each comprising a first resin, the second portion comprising a second resin that is different than the first resin;
    a first LDS antenna disposed on the first portion of the carrier;
    a second LDS antenna disposed on the third portion of the carrier;
    a first component coupled to the first LDS antenna via a first connection point positioned on a surface of the first portion of the carrier such that the first component is in electrical communication with the first LDS antenna via the first connection point; and
    a second component coupled to the second LDS antenna via a second connection point positioned on a surface of the third portion of the carrier such that the second component is in electrical communication with the second LDS antenna via the second connection point positioned on the surface of the third portion of the carrier.

20. The LDS antenna assembly of claim 19, of the carrier and the third portion of the carrier are separated from one another via the second portion of the carrier.

* * * * *